United States Patent [19]

Tortorici et al.

[11] 4,006,000
[45] Feb. 1, 1977

[54] ALL DRY AIR CLEANER

[75] Inventors: Domenic P. Tortorici; John J. Dreznes, both of Chicago, Ill.

[73] Assignee: United Filtration Corporation, Chicago, Ill.

[22] Filed: Feb. 7, 1975

[21] Appl. No.: 547,808

Related U.S. Application Data

[63] Continuation-in-part of Ser. No. 477,043, June 6, 1974, abandoned.

[52] U.S. Cl. .................................. 55/323; 55/337; 55/459 R; 55/482; 55/502; 55/503; 55/507; 55/509; 55/DIG. 28
[51] Int. Cl.² .......................................... B01D 50/00
[58] Field of Search ............ 55/337, 429, 432, 487, 55/459, 480, 478, 481, 482, 498, 510, 350, 323, 502, 503, 507, 509, DIG. 28, 501, 504; 210/232, 489

[56] References Cited

UNITED STATES PATENTS

| | | | |
|---|---|---|---|
| 1,860,778 | 5/1932 | Howard | 55/503 X |
| 1,918,006 | 7/1933 | Walton | 55/504 X |
| 2,416,851 | 3/1947 | Sebok | 55/503 X |
| 2,442,696 | 6/1948 | Krieck | 55/509 X |
| 2,822,059 | 2/1958 | Lunn et al. | 55/487 |
| 2,962,121 | 11/1960 | Wilber | 55/504 X |
| 3,085,383 | 4/1963 | Garbig | 55/510 X |
| 3,218,785 | 11/1965 | Tietz | 55/510 X |
| 3,260,367 | 7/1966 | Hultgren | 210/232 X |
| 3,298,149 | 1/1967 | Sobeck | 55/510 X |
| 3,307,336 | 3/1967 | Dewsberry | 55/337 |
| 3,319,404 | 5/1967 | Lowther | 55/337 X |
| 3,385,038 | 5/1968 | Davis | 55/502 X |
| 3,423,909 | 1/1969 | Bennett et al. | 55/510 X |
| 3,442,067 | 5/1969 | Swenson | 55/337 X |
| 3,535,853 | 10/1970 | Brown et al. | 55/510 X |
| 3,615,018 | 10/1971 | Johnson | 210/232 |
| 3,672,130 | 6/1972 | Sullivan et al. | 55/509 X |
| 3,680,286 | 8/1972 | Nostrand et al. | 55/502 X |
| 3,812,370 | 5/1974 | LaViolette | 55/509 X |
| 3,862,903 | 1/1975 | Getzin | 55/509 X |

*Primary Examiner*—Frank W. Lutter
*Assistant Examiner*—Kathleen J. Prunner
*Attorney, Agent, or Firm*—Kinzer, Plyer, Dorn & McEachran

[57] ABSTRACT

An air cleaner assembly for use with an internal combustion engine. A housing is provided having an inlet for receiving dirty air, a clean air outlet, and a dust port for discharging dust which has been separated from the air. A plenum chamber has an inlet for receiving clean air from the housing outlet, an outlet adapted to be connected to the intake of an internal combustion engine and fastening means for securing the plenum chamber in a fixed position relative to the engine. The housing and plenum chamber are detachably interconnected so that only a minimum outward displacement of the housing away from the plenum chamber is required for removal of the housing for inspection and servicing.

6 Claims, 4 Drawing Figures

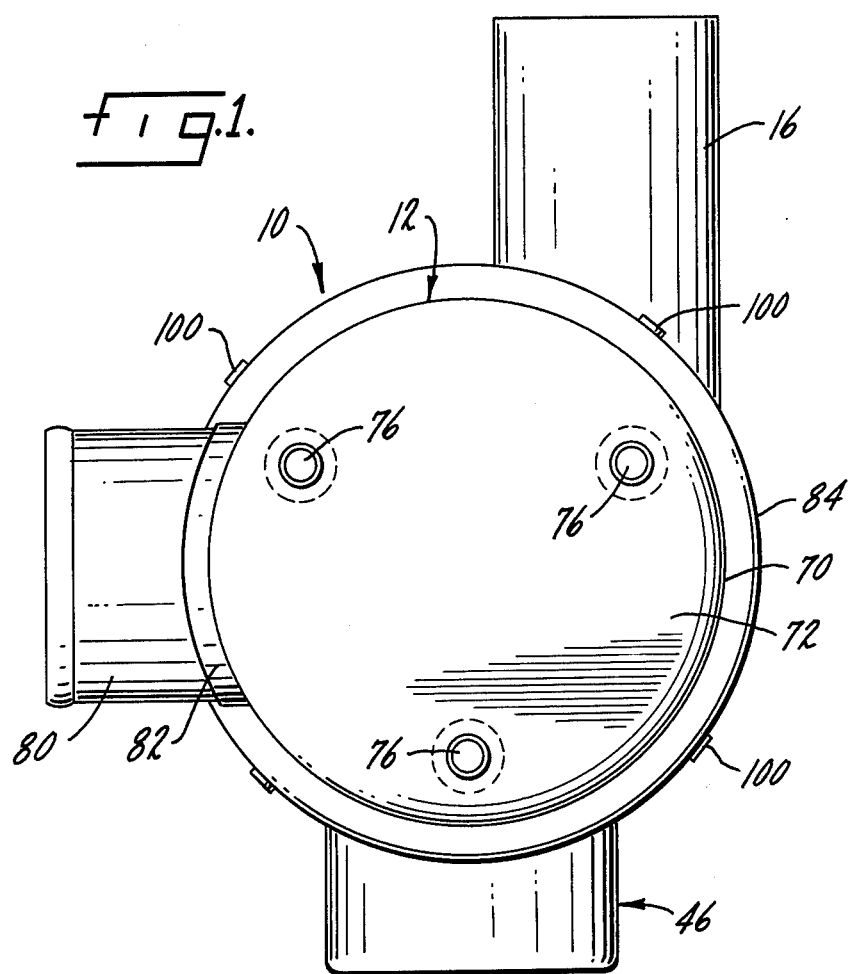
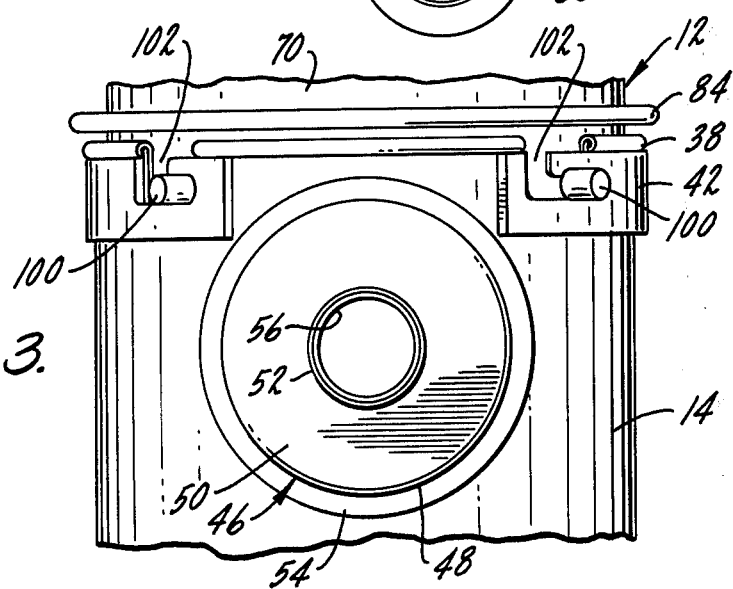

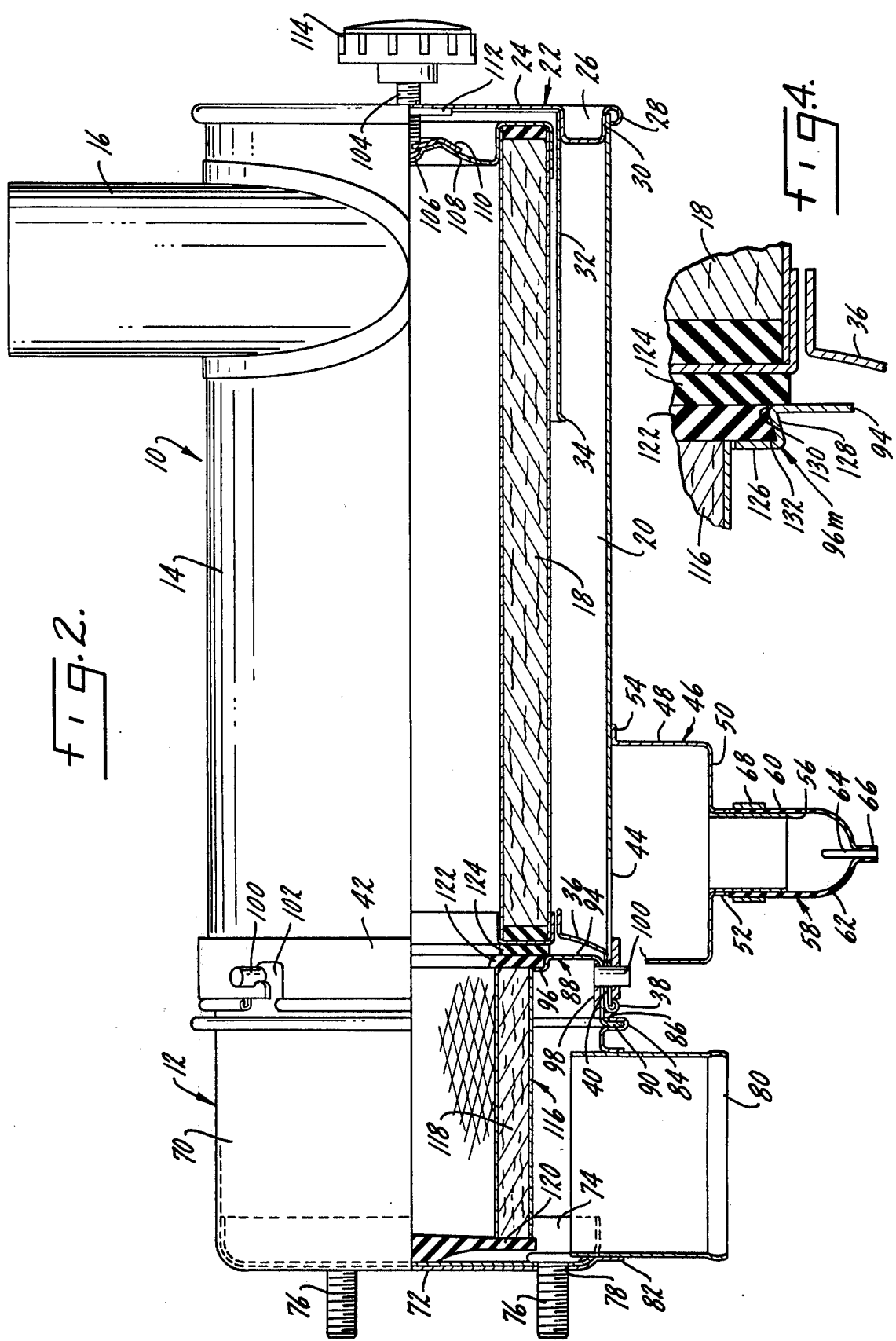

ALL DRY AIR CLEANER

CROSS REFERENCE TO RELATED APPLICATIONS

This application is a continuation in part of my prior copending application Ser. No. 477,043, filed June 6, 1974, now abandoned.

SUMMARY OF THE INVENTION

This invention relates in general to air cleaners and more particularly to an air cleaner which is completely dry in operation, meaning that it does not use any oil or fluid as a part of or in connection with its cleaning cycle.

An air cleaner assembly for use with an internal combustion engine is provided which comprises a plenum chamber secured to the engine and a detachable outer housing for receiving and cleaning dirty air from the atmosphere. The housing has an inlet for receiving air from the atmosphere, an outlet through which clean air is delivered to the plenum chamber and a dust port for discharging dust separated from the air in the housing. The plenum chamber has an inlet for receiving the clean air from the housing, an outlet adapted to be connected to the intake of an internal combustion engine, and fastening means for securing the plenum chamber in a fixed position relative to the engine. The housing and plenum chamber are detachably interconnected so as to clean air between them and permit the removal of the housing for inspection and servicing.

A primary object of the present invention is an air cleaner assembly in which only a minimum outward displacement of the air cleaner housing is required for its removal, thereby allowing as large as air cleaner as possible to be installed in the limited space provided therefor.

Another object is an all dry air cleaner assembly with the air cleaner housing being detachable from a smaller plenum chamber which is generally permanently installed on an engine.

Another object is an all dry air cleaner assembly having a filter contained within the detachable housing, with the filter being replaceable upon removal of the housing.

Another object is an all dry air cleaner assembly in which the outward displacement, which is required for removal of the air cleaner housing and replacement of the air cleaner filter, is substantially less than the lengths of the housing and main filter element.

Another object is an all dry air cleaner in which replacement of the filter is greatly facilitated.

Another object is an all dry air cleaner assembly in which a safety or secondary filter is provided for cleaning the air before discharging it into an engine if a premature failure of the primary element should occur.

Another object is an all dry air cleaner assembly in which the safety filter is snap-fitted into the plenum chamber to seal and securely position a safety filter within the plenum chamber inlet thereby to protect the engine when the housing is detached.

Another object is an all dry air cleaner assembly in which the cleaning surface of a filer is disposed through generally the entire length of the assembly.

Another object is an all dry air cleaner assembly which, everything else being equal, has more cleaner surface for the same axial under hood space.

Another object is an all dry air cleaner assembly which will have a greater capacity when confined to a given under hood space.

Another object is a generally two-part air cleaner body so that the housing may be removed without disturbing the connection between the air cleaner assembly and the intake of an internal combustion engine.

Another object is an all dry air cleaner assembly in which the housing, although detachable, is rigidly secured to the assembly when attached.

Other objects will become apparent from reference to the following description, attached drawings and appended claims.

BRIEF DESCRIPTION OF THE DRAWINGS

FIG. 1 is an end plan view of an all dry air cleaner constructed in accordance with the concepts of the present invention.

FIG. 2 is a side view, partly in section, with the left portion rotated out of position for clarity.

FIG. 3 is a partial bottom plan view of the invention showing the connection between the plenum chamber and housing, also showing the dust port and adaptor with the dust unloader removed.

FIG. 4 is an enlarged sectional side view of a modified snap-fit arrangement of the safety filter in the plenum chamber inlet.

DESCRIPTION OF THE PREFERRED EMBODIMENTS

In FIG. 1, the air cleaner has been indicated generally at 10 and includes a plenum chamber 12 and a generally cylindrical housing 14 attachable to the plenum chamber 12, as best shown in FIG. 2.

In order to describe the various elements of the embodiment shown in the drawing, the following directional terms of orientation are used consistently throughout the specification. Inner and inwardly refer to the axial direction to the left as seen in FIG. 2, indicating a direction inwardly toward the internal combustion engine to which the plenum chamber may be attached as described below. Outer and outwardly therefore refer to the axial direction toward the right as seen in FIG. 2, meaning outwardly away from the engine. Inside and outside indicate radial direction.

An inlet 16 is provided to admit dirty air to be cleaned and may be positioned generally tangentially at one end of the housing 14. The air enters through the inlet 16 moving tangentially to the inside surface of the housing 14, as best shown in FIG. 1, and flows into a rotary or swirling motion. A filter element 18, which is generally cylindrical and annular, is positioned in the housing and has an outside diameter which is substantially less than the inside diameter of the housing. Thus, an air swirl zone 20 is set up in an annular, somewhat cylindrical space, which extends substantially or approximately the entire length of the housing. The outer end of the housing is closed by the end cap 22 which comprises a round, generally flat center section 24 integral with an inwardly offset annular channel section 26, the outside wall of which engages the inside surface of the outer edge of housing 14 about which it is curled as at 28 to form a smooth outer edge. The end cap 22 may be welded or otherwise suitably connected to housing 14, as at 30. A baffle or sleeve 32 is fitted and suitably secured, such as by welding, in the inside wall of the end cap channel section 26 and extends a short distance toward the inner end of the housing and terminates at 34.

Sleeve 32 preferably extends inwardly at least as far as the inner edge of housing inlet 16, as shown in FIG. 2, since one of its purposes is to prevent incoming air from going directly into and through filter element 18. The nature and purpose of such a sleeve has been fully described in U.S. Pat. No. 3,048,959 issued Aug. 14, 1962.

It will be noted that the sleeve or air baffle 34 has a diameter somewhat greater than the outside diameter of the filter element 18 so that the entire length of the filter element may be used and the portion surrounded by the sleeve 32 is not blocked off.

The inner end or outlet of housing 14 is generally open except for an annular guide ring 36 which serves to guide filter 18 into the housing and support the inner end of the filter in a somewhat central position. The inner end of guide ring 36 extends inwardly in circumferential engagement with the inside surface of housing 14 and curls around the inner edge thereof as at 38 to form a smooth rounded edge. Guide ring 36 may be welded or otherwise suitably secured to housing 14 as at 40.

A slot ring 42 is mounted about the housing in engagement with the outside surface thereof. The inner edge of slot ring 42 abuts against the rounded edge 38 of guide ring 36 to prevent the inward movement of the slot ring relative to the housing. Slot ring 42 is formed of somewhat thicker material than the housing 14 for a purpose to be described below.

The housing has a dust port 44 which is surrounded by a dust chamber 46 mounted by welding or the like on the outside of the housing. The chamber consists of a generally cylindrical wall 48 integral with an annular base 50 having a turned down lip forming a generally cylindrical spout 52. The side wall 48 has a tuned out upper edge or flange 54 which may be welded or otherwise suitably connected to the housing and takes on a saddle appearance so that it conforms to the cylindrical outside surface of the housing.

An adaptor 56 may be mounted by welding or the like to the dust chamber spout 52. The adaptor is a generally cylindrical extension of the spout, being fitted into the same and extending downward therefrom.

A dust unloader, indicated generally at 58, is positioned on the adaptor. The unloader has a generally cylindrical upper portion 60 telescoped around the adaptor and then hemisphered in at 62 to a discharge passage 64, defined between a pair of generally parallel, closely spaced lips 66. The entire unloader may be made of a rubber-like material or rubber substitute or any suitable material having the general characteristics of rubber as to flexibility and elasticity. Unloader 58 is fitted onto adaptor 56 sufficiently tight to prevent leakage but loose enough that the unloader may be rotated to orient the discharge slot 64 in any desired position. A clamp 68 or the like may be used of any suitable construction to hold the unloader in a fixed position. A detailed description of an unloader of this general type and its function is contained in U.S. Pat. No. 3,319,404.

Plenum chamber 12, to which the housing is detachably interconnected, consists of a generally cylindrical side wall 70 integral with a generally flat inner surface 72 closing the inner end of the plenum chamber. A reinforcing plate 74 is fitted within the plenum chamber to strengthen the inner end 72 and an adjoining portion of the side walls 70. The reinforcing plate is engaged flush against the inside surface of the plenum chamber so as to increase the strength and rigidity of the flat inner surface 72 and the outwardly rounded edges thereof, thereby resisting further the movement of force created at the rounded edges due to the weight of the air cleaner assembly.

A plurality of bolts 76 are provided which extend inwardly through holes 78 provided therefore in the flat inner base 72 and reinforcing plate 74 and are sealed in such holes, as by welding or the like. The bolt heads are disposed within the plenum chamber with the threaded ends extending inwardly therefrom to be secured into the engine block of an internal combustion engine or a suitable bracket provided to mount the air cleaner in a fixed position relative to the engine. The annular bearing surfaces between the heads of bolts 76 and the inner plate 72 of the plenum chamber are strengthened by the presence of the reinforcing plate 74 therebetween.

The plenum chamber 12 has an air discharge or outlet 80 which is adapted to be connected to the intake of an internal combustion engine for delivering clean air thereto. In the preferred embodiment, outlet 80 extends radially outwardly from the side of the plenum chamber as shown in FIG. 1. The outlet is rotated out of position in FIG. 2 for clarity so that the radially projecting generally cylindrical flange 82 of the plenum chamber may be shown. Flange 82 receives outlet 80 in circumferential engagement therewith and is rigidly secured by welding or other suitable means thereto.

It is to be understood that the open outer end of the plenum chamber constitutes the plenum chamber inlet. Similarly, the outlet of the housing is simply the open inner end thereof.

Adjacent the inlet end of the plenum chamber, the sidewall 70 projects generally perpendicularly outwardly forming a narrow U-shaped circumferential channel section 84. Sidewall 70 terminates at 86 at the end of channel section 84. To further extend the plenum chamber outwardly from channel 84, an annular insert member 88 is provided having an inner flange 90, engaged within the channel section 84, a radially directed annular face plate 94, spaced axially from flange 90, and an angle member 96 integral with the inside edge of face plate 94. Angle member 96 strengthens the face plate 94 against bending and provides a seat, as will be described below.

A reinforcing ring 98 is fitted within the insert member 88 and may be welded or otherwise suitably secured thereto. A plurality of pins 100 extend radially outwardly from reinforcing ring 98 and through insert member 88 as shown in FIG. 2, said pins being rigidly secured to both the reinforcing ring 98 and the insert member 88 by welding or other suitable means.

For receiving the pins 100, slots 102 are provided in the housing slot ring 42. Each slot is generally J-shaped, extending generally axially into the housing from the outlet edge thereof and then laterally and inwardly, terminating in closed ensds within the slot ring 42. Slots 102 are aligned circumferentially about the slot ring 42 with the pins 100. To allow the pins 100 to be inserted into slots 102, the plenum chamber insert member 88 has an outside diameter slightly less than that of the housing 14 so that it may be received within the outlet end of housing 14 in circumferential engagement therewith.

To lock housing 14 into engagement with plenum chamber 12, a thrust stud 104 or the like is threaded through the outer end plate 22 of the housing to cooperate with a central depression 106 in a filter cap 108 which closes and seals the outer end of filter 18. Thrust stud 104 may be provided with an annular bearing plate 110 which conforms to the shape of the filter cap 108 adjacent the central depression 106 for the purpose of distributing the force applied to the filter by tightening of the thrust stud and further to hold the filter in a central position within the housing. A thread plate 112 may be welded or otherwise rigidly secured against the inner surface of the end cap 22 to provide a thickened portion in the flat end plate 24 through which the thrust stud may be threaded. Similarly, a handle 114 may be provided on the outer end of thrust stud 104 to facilitate tightening of the thrust stud.

A safety filter 116 may be provided for insertion into the plenum chamber to filter the air received from housing 14 before discharging it through outlet 80 if the main element fails. As shown in FIG. 2, the safety filer 116 consists of generally cylindrical filter element 118, a generally round seal 120 closing the inner end of the safety filter and an annular outer seal 122 which seats within the angle section 96 of the plenum chamber face plate 88. A seal 124 may be provided for insertion between the filter 18 and safety filter 116 to prevent the escape of clean air passing between them.

In accordance with a further aspect of the invention, angle section 96 of plenum chamber face plate 94 may be slightly modified to provide a snap-in action for resiliently holding safety filter 116 in place within the plenum chamber. As shown in FIG. 4, a modified angle section 96m has a generally radially upstanding annular stop surface 126 and a generally axially extending annular bearing surface 128. The cross section of the modified angle section has a modified L-shape with an outer portion 130 of annular surface 128 toward the housing having a slightly smaller diameter than an inner portion 132 toward the plenum chamber. Angle section 96m thus provides a snap-in fit for the safety filter much like a dove tail joint.

Accordingly, as safety filter 116 is inserted into the plenum chamber, the annular outer seal 122 first engages outer portion 130 thereby bending face plate 94 inwardly until seal 122 is snapped into inner portion 132. In the embodiment shown in FIG. 4, the resiliency of both face plate 94 and angle section member 96m contribute to the snap-in action. In other embodiments stop surface 126 may be eliminated and/or bearing surface 128 may be circumferentially non-continuous constituting a series of generally S-shaped inward projections with the safety filter annular seal 122 sealing against the inside edge of face plate 94. Similarly, a plurality of clips and detent portions or other types of spring loaded fasteners could be provided on the outside circumferential edge of the safety filter and inside circumferential edge of the plenum chamber inlet to resiliently grip the safety filter in its installed position. The important point is that the safety filter is snap-fitted into position so that when the housing and main filter are detached and removed for servicing or whatever, the engine remains protected from dirt entering the intake. The safety filter is snap-fitted into position to prevent it from freely falling out of the plenum chamber and to seal it against the plenum chamber inlet to insure that all air passing through the plenum chamber must pass through the safety filter. A typical situation might occur where an unknowing operator starts and operates the engine on which the air cleaner is installed while the housing is removed.

The use, operation and function of the invention are as follows:

An all dry air cleaner is provided which is composed bascially of a cylindrical housing detachably connected to a plenum chamber secured to an internal combustion engine. Dirty air is brought into the housing through an inlet which is constructed and arranged to set up a helical swirl of dirty air around a generally annular and cylindrical element. Centrifugal force will cause the dust and dirt in the air to move or be thrown to the outside and the cleaner air on the inside of the helical swirl will be drawn through the filter element and discharged through the housing outlet. The clean air is drawn into the plenum chamber inlet, through the safety filter contained within the plenum chamber and finally it is discharged through the plenum chamber outlet. It will be understood that the plenum chamber outlet is normally connected to the suction or intake of an internal combustion engine, be it diesel, multi-fuel, gasoline, or whatever.

The dirt and dust separated from the air in the housing is forced through a dust port at the inner end of the housing due to centrifugal force and the flow of air through the housing. The dust is collected within the dust chamber 46 and unloader 58. During operation of the engine, a slight vacuum exists inside of the housing due to the suction of the engine. Thus, the air pressure inside the housing is somewhat lower than the atmospheric air pressure on the outside. This tends to close the lips of the unloader. The result is that a certain head pressure of dust in the chamber will be required to overcome this pressure differential and force the lips open. As soon as the engine stops and the pressure inside the clean air housing becomes atmospheric, the dust unloader will immediately unload since the pressure differential has been removed.

The air cleaner assembly is constructed so that when either the main filter element or safety filter element become sufficiently clogged with dirt and dust, the housing may be detached from the plenum chamber to permit the removal and cleaning or replacement of the filter elements. To remove the housing from the plenum chamber, thrust stud 104 must be loosened sufficiently to allow the housing to be pushed further onto the plenum chamber, thereby forcing the plenum chamber pins away from the closed ends of the housing slots.

Once the housing has been removed from the plenum chamber the main filter element may be withdrawn from the outlet end of the housing and cleaned or replaced and reinserted. Likewise, since the space formerly occupied by the housing is vacant with the housing removed, the safety filter within the plenum chamber may be freely removed and cleaned or replaced and reinserted. Replacement of the housing onto the plenum chamber is then simply the reversal of the removal operation. With the slots in the housing wall circumferentially aligned with the plenum chamber pins, the housing may be pushed onto the plenum chamber insert member so that the pins are received within the housing slots. Rotating the housing in a counter-clockwise direction with a slight outward travel then engages the pins against the closed end of the housing slots. Tightening the thrust stud at the outer end of the housing then forces the main filter element against the seal interposed between the two filter elements thereby exerting an outwardly directed axial force against the end cap of the housing which tends to lock the pin and slot connections in their fully closed positions.

The detachable connection between the plenum chamber and housing has been shown in the preferred embodiment as a plurality of pin and slot connections. But it should be understood that the specific structure of the pins and slots may be varied. Arcuate-shaped slots or slots in the plenum chamber with pins disposed on the housing may be provided. In fact, in other embodiments of the invention the pin and slot connections may be replaced by fastening clips, a ring clamp mounted about the circumference of the outer member as the plenum chamber and housing are fitted one within the other, or even a threaded connection where the inner end of the housing could be screwed onto or into the inlet end of the plenum chamber.

An important point is that the connecting means be so constructed that the housing may be removed from the plenum chamber with only a minimum outward displacement of the housing away from the plenum chamber. Thus, with a given under hood space for the installation of the air cleaner, the present invention allows for a unit of maximum length to be installed. Since the housing need not be withdrawn over the filter and the filter need not be removed axially from the end of the housing while connected, an air cleaner constructed in accordance with the present invention may be installed which is almost as long as the space provided for it. Certainly, the minimum outward axial displacement required for removal of the housing is substantially less than the length of either the main filter element or the housing itself.

Further to minimize the space required for the air cleaner assembly or conversely, to maximize the length of the air cleaner for a given under hood space, the housing inlet, dust chamber and plenum chamber outlet are all positioned on the side walls of the respective units within the dimensions of the end surfaces. Thus, not only does the air cleaner assembly extend through substantially the entire length of space provided therefor, but also the cleaning surface of a filter element is provided substantially along the entire length of the air cleaner.

The safety element has a larger pore size than the main element and is intended to function only if the main element fails to protect the engine in the event of failure of the main element. While this unit has been shown in the drawings and described as generally horizontal, it should be understood that it will also function efficiently when vertically disposed or on an incline. So the terms in the claims, such as "longitudinal", "lateral" etc. are merely for orientation and not a limitation.

While I have shown and described one form of the invention, it should be understood that the particular form shown is merely one of several physical embodiments. For example, under certain circumstances the air cleaner assembly of the invention may have a cyclonic or centrifugal action in the housing with the only filter being positioned in the plenum chamber. Further, in certain circumstances, the unit may be used merely as a so-called precleaner with no filter elements installed.

We claim:

1. An air cleaner assembly comprising:

a generally cylindrical housing having a dirty air inlet through the housing, said inlet being connected tangentially to the housing and arranged therewith to set up a helical swirling motion of the air in the housing, a clean air outlet opening through one end of the housing, the opposite end of the housing being closed to prevent the flow of air therethrough, a generally cylindrical main filter insertable into the housing and of a length to be wholly confined therein, means secured to the housing for supporting and generally axially aligning the main filter within the housing, said filter having an outside diameter less than the inside diameter of the housing so as to partially define a generally cylindrical air swirl zone between the filter and housing, a separate plenum chamber having a sidewall and an end surface closing one end, an inlet through the other end of the plenum chamber constructed to be coupled with the housing outlet to receive clean air therefrom, and an outlet through the side wall of the plenum chamber constructed for connection to an air intake of an internal combustion engine to establish communication of air therebetween, a safety filter insertable into the plenum chamber and of a length to be wholly confined therein, means for seating the safety filter in position between the plenum chamber inlet and outlet, connecting means for detachably fastening the outlet end of the housing to the inlet end of the plenum chamber in an attached position thereby establishing communication between the housing outlet and plenum chamber inlet, said connecting means being so constructed that only a limited axial displacement of the housing away from the plenum chamber is required for detachment and removal of the housing and main filter therewith, said displacement being substantially less than the length of the housing, and the housing outlet and plenum chamber inlet comprising open ends of the generally cylindrical housing and plenum chamber respectfully, said ends being so constructed as to fit one within the other in generally circumferential engagement in the attached position, thereby cooperating with said connecting means to fasten the housing and plenum chamber together.

2. The structure of claim 1 wherein said means for seating the safety filter provides a snap-in fit wherein said means resiliently grips the safety filter in position and seals it against the plenum chamber inlet to insure that all air passing through the plenum chamber must pass through the safety filter.

3. The structure of claim 1 wherein said means for seating the safety filter comprises an annular angle member having a generally radially standing annular stop surface and a generally axially extending annular bearing surface, said bearing surface having an outer portion toward the housing with a slightly smaller diameter than an inner portion toward the plenum chamber so that the safety filter may be resiliently forced through the outer portion and snapped into said inner portion.

4. The structure of claim 1 wherein said connecting means comprises a plurality of generally circumferentially spaced pin and slot connections, said pins projecting radially outwardly from the plenum chamber and being positioned adjacent to and generally equidistant from the open end of the plenum chamber, and said slots extending axially into the housing in circumferential alignment with the pins and then laterally, terminating in closed ends.

5. The structure of claim 4 further comprising means associated with said other end of the housing for applying an axial force against said main filter to compress the main filter and safety filter together end to end and to rigidly engage said pins against closed ends of the slots.

6. The structure of claim 5 further comprising an annular seal to be interposed between said filters with the housing in its attached position.

* * * * *